US009597601B2

(12) United States Patent
Tanaka et al.

(10) Patent No.: US 9,597,601 B2
(45) Date of Patent: Mar. 21, 2017

(54) METHOD FOR DISPLAYING CHAT WINDOW APPLIED TO NETWORK GAME

(71) Applicant: KABUSHIKI KAISHA SQUARE ENIX, Tokyo (JP)

(72) Inventors: Hiromichi Tanaka, Tokyo (JP); Tomohiro Kusano, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

(21) Appl. No.: 14/069,861

(22) Filed: Nov. 1, 2013

(65) Prior Publication Data
US 2014/0057718 A1 Feb. 27, 2014

Related U.S. Application Data

(63) Continuation of application No. 10/390,765, filed on Mar. 19, 2003, now Pat. No. 8,597,123.

(30) Foreign Application Priority Data

May 14, 2002 (JP) .................. 2002-138360

(51) Int. Cl.
*A63F 13/00* (2014.01)
*A63F 13/87* (2014.01)
(Continued)

(52) U.S. Cl.
CPC .............. *A63F 13/87* (2014.09); *A63F 13/35* (2014.09); *A63F 13/53* (2014.09);
(Continued)

(58) Field of Classification Search
CPC .... A63F 13/12; A63F 13/87; A63F 2300/537; A63F 2300/572
(Continued)

(56) References Cited

U.S. PATENT DOCUMENTS 5,546,520 A   8/1996  Cline et al.
6,784,901 B1  8/2004  Harvey et al.
              (Continued)

FOREIGN PATENT DOCUMENTS

EP      1153508        5/2004
JP      2001-209475    8/2001
              (Continued)

OTHER PUBLICATIONS

MarioDragon. Diablo II Gameplay [online]. Mar. 26, 2009 [retrieved Jun. 5, 2015]. Retrieved from the Internet: <URL:https://www.youtube.com/watch?v=-EhReGR6n6k>.*
(Continued)

*Primary Examiner* — Dmitry Suhol
*Assistant Examiner* — David Duffy
(74) *Attorney, Agent, or Firm* — Greenblum & Bernstein, P.L.C.

(57) ABSTRACT

Players input their messages in their video game apparatuses and the messages are once collected at a server apparatus, thereafter they are distributed to all video game apparatuses from the game server apparatus. In a display screen of each video game apparatus, a chat window is displayed in order to display messages exchanged between the players on a game screen including a field and characters of the game. The chat window is sequentially enlarged up to a preset maximum number of lines when a new message is received from the game server apparatus. The chat window is sequentially reduced to the preset minimum number of lines when a predetermined time passes without any reception of new message or when the player performs a specific operation.

20 Claims, 13 Drawing Sheets

(51) Int. Cl.
  *A63F 13/35* (2014.01)
  *A63F 13/53* (2014.01)
  *H04L 12/18* (2006.01)
  *H04L 29/06* (2006.01)

(52) U.S. Cl.
  CPC .......... *H04L 12/1827* (2013.01); *H04L 67/38* (2013.01); *A63F 2300/50* (2013.01); *A63F 2300/537* (2013.01); *A63F 2300/572* (2013.01)

(58) Field of Classification Search
  USPC ................ 463/30, 40–42; 715/751, 758, 759
  See application file for complete search history.

(56) References Cited

U.S. PATENT DOCUMENTS

| | | | |
|---|---|---|---|
| 7,115,035 | B2 | 10/2006 | Tanaka |
| 2001/0033298 | A1* | 10/2001 | Slotznick ...................... 345/758 |
| 2001/0047626 | A1 | 12/2001 | Ohkado |
| 2002/0013167 | A1 | 1/2002 | Spaur et al. |
| 2003/0018718 | A1 | 1/2003 | Maehiro |

FOREIGN PATENT DOCUMENTS

| | | |
|---|---|---|
| WO | 00/46988 | 11/2001 |
| WO | 02/31701 | 4/2002 |

OTHER PUBLICATIONS

Diablo II Manual, Copyright 2000, Blizzard Entertainment.
EverQuest Screenshots, Pictures, Wallpapers—PC—IGN [online], Nov. 20, 1998 [retrieved on Oct. 4, 2012], Retrieved from the Internet: <URL:http://www.ign.com/images/games/everquest-pc-2252/4fa6c96bcdc388ed13e3dfab>.

* cited by examiner

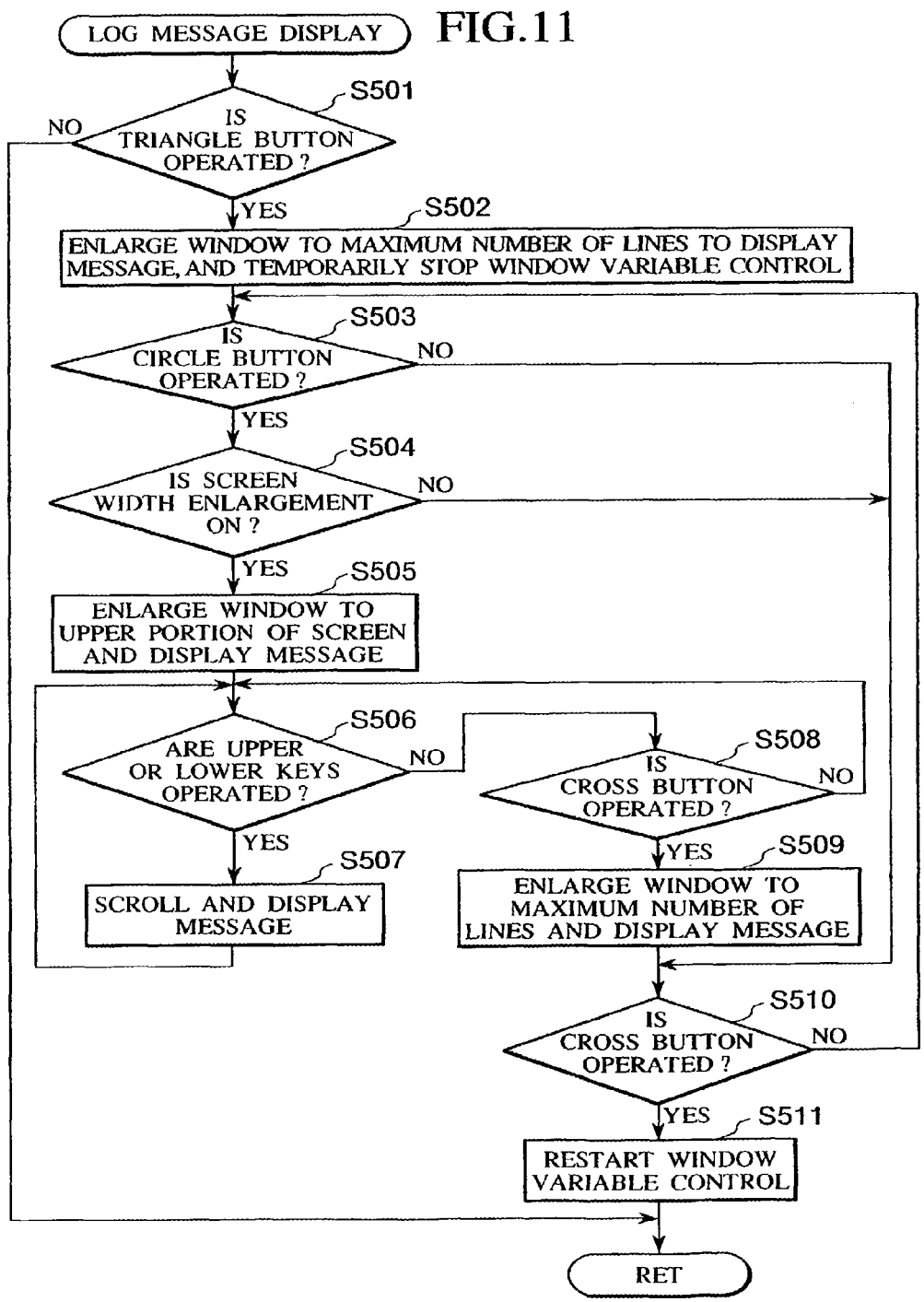

FIG.12A

```
NO WINDOW
```

FIG.12B  ⇩ MESSAGE RECEPTION

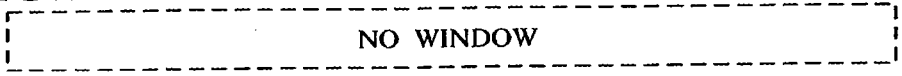

FILLIPPO: IS THIS...?

350

FIG.12C  ⇩ MESSAGE RECEPTION

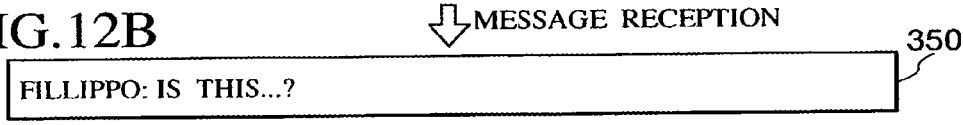

FILLIPPO: IS THIS...?
JULIA: THEY WENT OUT, BUT...

350

FIG.12D  ⇩ MESSAGE RECEPTION

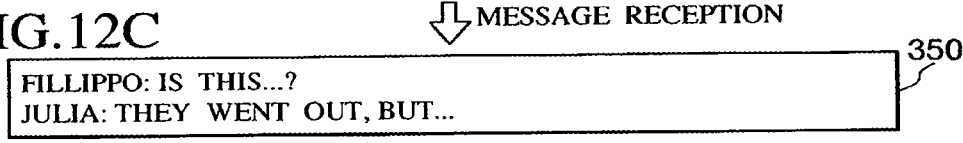

FILLIPPO: IS THIS...?
JULIA: THEY WENT OUT, BUT...
JULIA: BY THE WAY, GOOD EVENING, EVERYONE!

350

⇩ MESSAGE RECEPTION
⋮
⇩ MESSAGE RECEPTION

FIG.12E

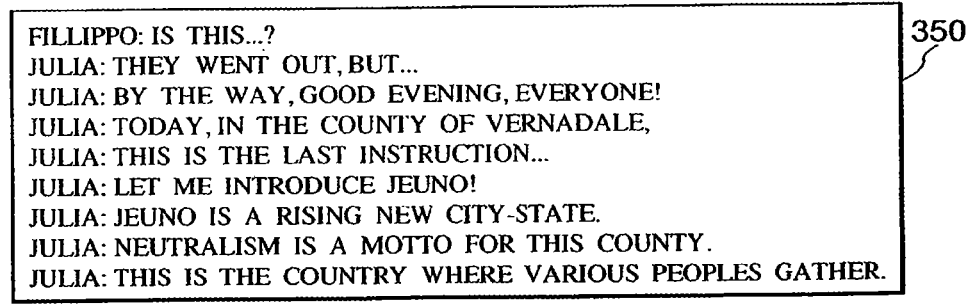

FILLIPPO: IS THIS...?
JULIA: THEY WENT OUT, BUT...
JULIA: BY THE WAY, GOOD EVENING, EVERYONE!
JULIA: TODAY, IN THE COUNTY OF VERNADALE,
JULIA: THIS IS THE LAST INSTRUCTION...
JULIA: LET ME INTRODUCE JEUNO!
JULIA: JEUNO IS A RISING NEW CITY-STATE.
JULIA: NEUTRALISM IS A MOTTO FOR THIS COUNTY.
JULIA: THIS IS THE COUNTRY WHERE VARIOUS PEOPLES GATHER.

350

FIG.12F  ⇩ MESSAGE RECEPTION

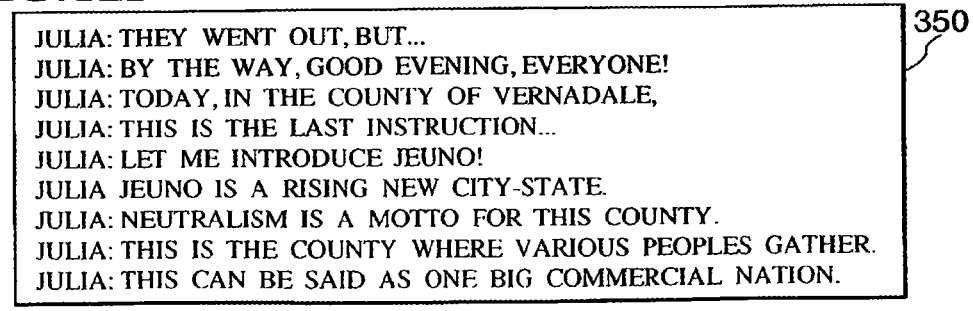

JULIA: THEY WENT OUT, BUT...
JULIA: BY THE WAY, GOOD EVENING, EVERYONE!
JULIA: TODAY, IN THE COUNTY OF VERNADALE,
JULIA: THIS IS THE LAST INSTRUCTION...
JULIA: LET ME INTRODUCE JEUNO!
JULIA JEUNO IS A RISING NEW CITY-STATE.
JULIA: NEUTRALISM IS A MOTTO FOR THIS COUNTY.
JULIA: THIS IS THE COUNTY WHERE VARIOUS PEOPLES GATHER.
JULIA: THIS CAN BE SAID AS ONE BIG COMMERCIAL NATION.

```
FILLIPPO: IS THIS...?
JULIA: THEY WENT OUT, BUT...
JULIA: BY THE WAY, GOOD EVENING, EVERYONE!
JULIA: TODAY, IN THE COUNTY OF VERNADALE,
JULIA: THIS IS THE LAST INSTRUCTION...
JULIA: LET ME INTRODUCE JEUNO!
JULIA: JEUNO IS A RISING NEW CITY-STATE.
JULIA: NEUTRALISM IS A MOTTO FOR THIS COUNTY.
JULIA: THIS IS THE COUNTY WHERE VARIOUS PEOPLES GATHER.
```
350

⇩ INTERVAL TIME OR CROSS BUTTON

FIG.13B

```
JULIA: THEY WENT OUT, BUT...
JULIA: BY THE WAY, GOOD EVENING, EVERYONE!
JULIA: TODAY, IN THE COUNTY OF VERNADALE,
JULIA: THIS THE LAST INSTRUCTION...
JULIA: LET ME INTRODUCE JEUNO!
JULIA: JEUNO IS A RISING NEW CITY-STATE.
JULIA: NEUTRALISM IS A MOTTO FOR THIS COUNTY.
JULIA: THIS IS THE COUNTY WHERE VARIOUS PEOPLES GATHER.
```
350

⇩ INTERVAL TIME OR CROSS BUTTON

FIG.13C

```
JULIA: BY THE WAY, GOOD EVENING, EVERYONE!
JULIA: TODAY, IN THE COUNTY OF VERNADALE,
JULIA: THIS THE LAST INSTRUCTION...
JULIA: LET ME INTRODUCE JEUNO!
JULIA: JEUNO IS A RISING NEW CITY-STATE.
JULIA: NEUTRALISM IS A MOTTO FOR THIS COUNTY.
JULIA: THIS IS THE COUNTY WHERE VARIOUS PEOPLES GATHER.
```
350

⇩ INTERVAL TIME OR CROSS BUTTON

⋮

⇩ INTERVAL TIME OR CROSS BUTTON

FIG.13D

```
JULIA: THIS IS THE COUNTY WHERE VARIOUS PEOPLES GATHER.
```
350

⇩ INTERVAL TIME OR CROSS BUTTON

FIG.13E

```
NO WINDOW
```

FIG.14A

JULIA: TODAY, IN THE COUNTY OF VERNADALE,
JULIA: THIS IS THE LAST INSTRUCTION...
JULIA: LET ME INTRODUCE JEUNO!
JULIA: JEUNO IS A RISING NEW CITY-STATE.
JULIA: NEUTRALISM IS A MOTTO FOR THIS COUNTY.
JULIA: THIS IS THE COUNTY WHERE VARIOUS PEOPL

TRIANGLE BUTTON

FIG.14B

FILLIPPO: IS THIS...?
JULIA: THE WENT OUT,BUT...
JULIA: BY THE WAY, GOOD EVENING, EVERYONE!
JULIA: TODAY, IN THE COUNTY OF VERNADALE,
JULIA: THIS IS THE LAST INSTRUCTION...
JULIA: LET ME INTRODUCE JEUNO!
JULIA: JEUNO IS A RISING NEW CITY-STATE.
JULIA: NEUTRALISM IS A MOTTO FOR THIS COUNTY.
JULIA: THIS IS THE COUNTY WHERE VARIOUS PEOPL

CIRCLE BUTTON

FIG.14C

JULIA: TO EVERYONE WHO IS LOOKING FORWARD TO
JULIA: I DEEPLY APOLOGIZE FOR TROUBLE.
JULIA: BOWED POLITELY TO FILLPPO.
JULIA: BOWED.
JULIA: WELL, LET'S GO IMMEDIATELY, TODAY!
JULIA: THIS IS THE LAURENTBERY CULTIVATED FIELD.
JULIA: HEAVENS BRIDGE IS LOCATED AHEAD.
FILLIPPO: HEAVENS BRIDGE?
JULIA: YES!
JULIA: LET'S GO! TO THE PLACE BEYOND THE HEAVENS
FILLIPPO: WELL, YES...
-AREA : LOWER JEUNO-
FILLIPPO: IS THIS...?
JULIA: THEY WENT OUT, BUT...
JULIA: BY THE WAY, GOOD EVENING, EVERYONE!
JULIA: TODAY, IN THE COUNTY OF VERNADALE,
JULIA: THIS IS THE LAST INSTRUCTION,...
JULIA: LET ME INTRODUCE JEUNO!
JULIA: JEUNO IS A RISING NEW CITY-STATE.
JULIA: NEUTRALISM IS A MOTTO FOR THIS COUNTY.
JULIA: THIS IS THE COUNTRY WHERE VARIOUS PEOPLES

METHOD FOR DISPLAYING CHAT WINDOW APPLIED TO NETWORK GAME

CROSS REFERENCE TO RELATED APPLICATION

This application is a continuation of pending U.S. patent application Ser. No. 10/390,765, filed on Mar. 19, 2003, which claims priority to Japanese Application No. 2002-138360, filed May 14, 2002, the contents of which are expressly incorporated herein by reference in their entireties.

BACKGROUND OF THE INVENTION

Field of the Invention

The present invention relates to a method for displaying messages, which are transmitted to each player's terminal, in a window in a network game in which multiple players participate to advance.

Description of the Related Art

Network games are games in which multiple players participate and advance the games. The network games include a game in which the respective players carry out communications with each other using chat. The respective players input their messages in their video game apparatuses and the messages are collected at a server apparatus, thereafter they are sent to each player's video game apparatus. The messages are sequentially scrolled and displayed in a chat window formed on a screen of the video game apparatus. The server apparatus generates messages when a predetermined event occurs in the course of the game, and sends them to each player's video game apparatus. These messages are also sequentially scrolled and displayed in the same chat window.

In the network games, each player is required to operate each player character in a field to clear various tasks in addition to exchanging the messages with other players. Accordingly, each player must watch both a game screen, which includes his/her player character displayed, player characters for other players existing therearound, and non-player characters, and a chat window, which includes the messages exchanged between the players.

The number of messages, which are exchanged between the players and displayed in the chat window per unit time, differs depending on the current progress of the game. There is a case in which numerous messages are sent to each player's video game apparatus from the server apparatus during a short period time. While, there is a case in which no message is sent to each player's video game apparatus from the server apparatus during a long period time. In the case where numerous messages are sent to each player's video game apparatus from the server apparatus for a short period time, unless the size of the chat window is large enough to display all of the messages, it is possible that a certain message displayed in the chat window is scrolled out from the chat window before the player finishes reading the message.

If the size of the chat window is large enough to display all of the messages, this problem can be prevented. However, the network game cannot be advanced with just a look at the messages sent from the server apparatus. As mentioned above, the player also must watch the game screen, which includes his/her player character, player characters for other players existing therearound, and non-player characters. This game screen is more important for the players than the messages of the chat window.

Accordingly, if the chat window area is increased to ensure display time of messages sent from the server apparatus, the game screen becomes unclear to watch. The unclear game screen prevents the progress of the game more than the fact that the messages cannot be fully read.

SUMMARY OF THE INVENTION

An object of the present invention is to variably control a display state of a message-display window displayed in a video game apparatus, which is a client in a network game, so as to balance the display of messages and that of the game screen.

In order to attain the above object, a network game system according to a first aspect of the present invention has a server apparatus and client apparatuses each connected to the server apparatus via a network. The server apparatus includes a message collector that receives messages input in each of the client apparatuses and transmitted therefrom. The server apparatus further includes a message distributor that distributes messages in accordance with progress of a game including the messages received by the message collector to each of the client apparatuses via the network. Each of the client apparatuses includes a message input device that inputs desired messages in accordance with the progress of the game according to a user's operation. Each client apparatus further includes a message transmitter that transmits the messages input from the message input device to the server apparatus via the network to cause the message collector to receive the messages. Each client apparatus further includes a message receiver that receives messages transmitted from the message distributor. Each client apparatus further includes a message display device that scrolls and displays messages received by the message receiver in a window displayed at a front side of a game screen. Each client apparatus further includes a window enlarging device that enlarges the window in response to reception of the message by the message receiver so as to increase the number of display lines of the messages in the window up to a preset maximum value. Each client apparatus further includes a window reducing device that reduces the window so as to decrease the number of display lines of the messages in the window to a preset minimum value when a predetermined condition is satisfied.

In the aforementioned network game system, the server apparatus distributes the messages, which include the messages collected from the respective client apparatuses, to the respective client apparatuses in accordance with the progress of the game. Each client apparatus increases the number of display lines in the window for displaying the messages up to the preset maximum value when receiving the message distributed from the server apparatus, and reduces the number of display lines in the window to the preset minimum value when a predetermined condition (particularly, a condition for which the importance of the message becomes low) is satisfied.

Even when the messages are distributed to the respective client apparatuses from the server apparatus one after another, the number of display lines in the window for displaying the messages is increased in each client apparatus. In each client apparatus, the distributed messages can be displayed for a sufficient time until they are scrolled out. The player can see each message for a sufficient time. In the case where a predetermined condition for which the importance of the message becomes low is established, the number of display lines in the window is reduced. The reduction in the number of display lines in the window makes it easy for the player to see the game screen. The balance between the display of the messages and the display of the game screen is improved in accordance with the progress of the game.

In order to attain the above object, a video game apparatus according to a second aspect of the present invention is connected, via a network, to a server apparatus, which is connected to at least one other video game apparatus via the network. The video game apparatus includes a message receiver that receives messages transmitted from the server apparatus via the network in accordance with progress of a game. The video game apparatus further includes a message display device that scrolls and displays the messages received by the message receiver in a window displayed on a game screen. The video game apparatus further includes a window enlarging device that enlarges the window in response to reception of the message by the message receiver so as to increase the number of display lines of the messages in the window up to a preset maximum value. The video game apparatus further includes a window reducing device that reduces the window so as to decrease the number of display lines of the messages in the window to a preset minimum value when a predetermined condition is satisfied.

In order to attain the above object, a video game apparatus according to a third aspect of the present invention is connected, via a network, to a server apparatus, which is connected to at least one other video game apparatus via the network. The video game apparatus includes a memory that stores a network game program. The video game apparatus further includes a processor that executes the network game program. The video game apparatus further includes a display device that displays a processing result of the network game program performed by the processor. The video game apparatus further includes a communications apparatus that communicates with the server apparatus. The network game program causes the processor to execute receiving messages transmitted from the server apparatus via the network in accordance with progress of a game. The network game program further causes the processor to execute scrolling and displaying the received messages in a window displayed on a game screen. The network game program further causes the processor to execute enlarging the window in response to reception of a newly received message so as to increase the number of display lines of the messages in the window up to a preset maximum value. The network game program further causes the processor to execute reducing the window so as to decrease the number of display lines of the messages in the window to a preset minimum value when a predetermined condition is satisfied.

The video game apparatuses according to the second and third aspects can use a general-purpose computer such a personal computer, etc., in addition to the video game dedicated apparatus. The video game apparatuses according to the second and third aspects can use other electronic equipment capable of operating as a computer apparatus such as a cellular phone, etc. Moreover, the apparatuses according to the second and third aspects can be used regardless of whether they are portable or stationary types.

In the video game apparatus according to the third aspect, the network game program stored in the memory can be provided as being recorded on a computer-readable storage medium. This computer-readable storage medium may be a storage medium, which is structured to be attachable and detachable to and from the computer apparatus to be provided separately from the computer apparatus. This computer-readable storage medium may be a storage medium such as a fixed disk apparatus, which is provided in the computer apparatus and provided together with the computer apparatus. The network game program stored in the memory in the video game apparatus according to the third aspect can be distributed via a network from a server apparatus existing on the network after superimposing the data signal of the program on a carrier wave.

In order to attain the above objects, a message display controlling method in a network game according to a fourth aspect of the present invention is executed in a video game apparatus, which is applied to the network game that advances a game by being connected to a server apparatus via a network. The above method includes receiving messages transmitted from the server apparatus via the network in accordance with progress of a game. The method further includes scrolling and displaying the received messages in a window displayed at a front side of a game screen. The above method further includes enlarging the window in response to reception of a newly received message so as to increase the number of display lines of the messages in the window up to a preset maximum value. The method further includes reducing the window so as to decrease the number of display lines of the messages in the window to a preset minimum value when a predetermined condition is satisfied.

BRIEF DESCRIPTION OF THE DRAWINGS

FIG. 11 is a flowchart showing log message display processing to be executed by each video game apparatus in the network game system according to an embodiment of the present invention;

FIGS. 12A to 12F are views each explaining the enlargement of the chat window in the network game system according to an embodiment of the present invention;

FIGS. 13A to 13E are views each explaining the reduction of the chat window in the network game system according to an embodiment of the present invention; and FIGS. 14A to 14C are views each explaining the log message display in the network game system according to an embodiment of the present invention.

DETAILED DESCRIPTION OF PREFERRED EMBODIMENTS

Preferred embodiments will be explained with reference to the drawings.

Figure 1:
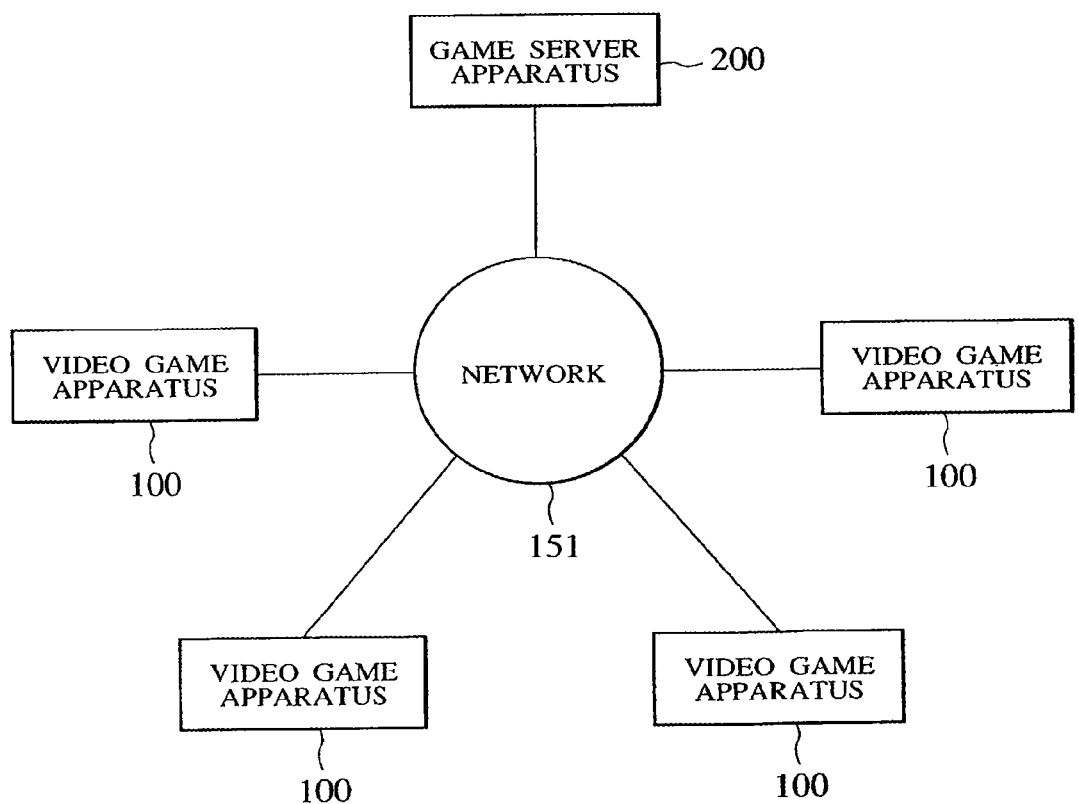
FIG. 1 is a block diagram illustrating a configuration of a network game system according to an embodiment of the present invention.

FIG. 1 is a block diagram illustrating a configuration of a network game system according to an embodiment. As illustrated in this figure, this network game system includes multiple (four in this embodiment) video game apparatuses 100 and a game server apparatus 200. The video game apparatuses 100 are connected to the game server apparatus 200 via a network 151.

In the network game provided by this system, four player characters, which are operated by four players, who are users of the respective video game apparatuses 100, form a party as necessary and develop the game. Though the number of player characters is four here since the number of video game apparatuses is four, the number of player characters may change in accordance with the number of video game apparatuses.

Communications among the players are carried out by exchanging messages in the form of chat as each player character's words. In this network game, non-player characters, which are operated by processing of the game server apparatus 200, exist in addition to the four player characters. Non-player characters include characters, which give information when the player character speaks to them, and enemy characters, which wage a battle with the player characters. Information, which the non-player characters give the player character, and information, which indicates a result of the battle, are sent to each video game apparatus 100 from the game server apparatus 200.

Figure 2:
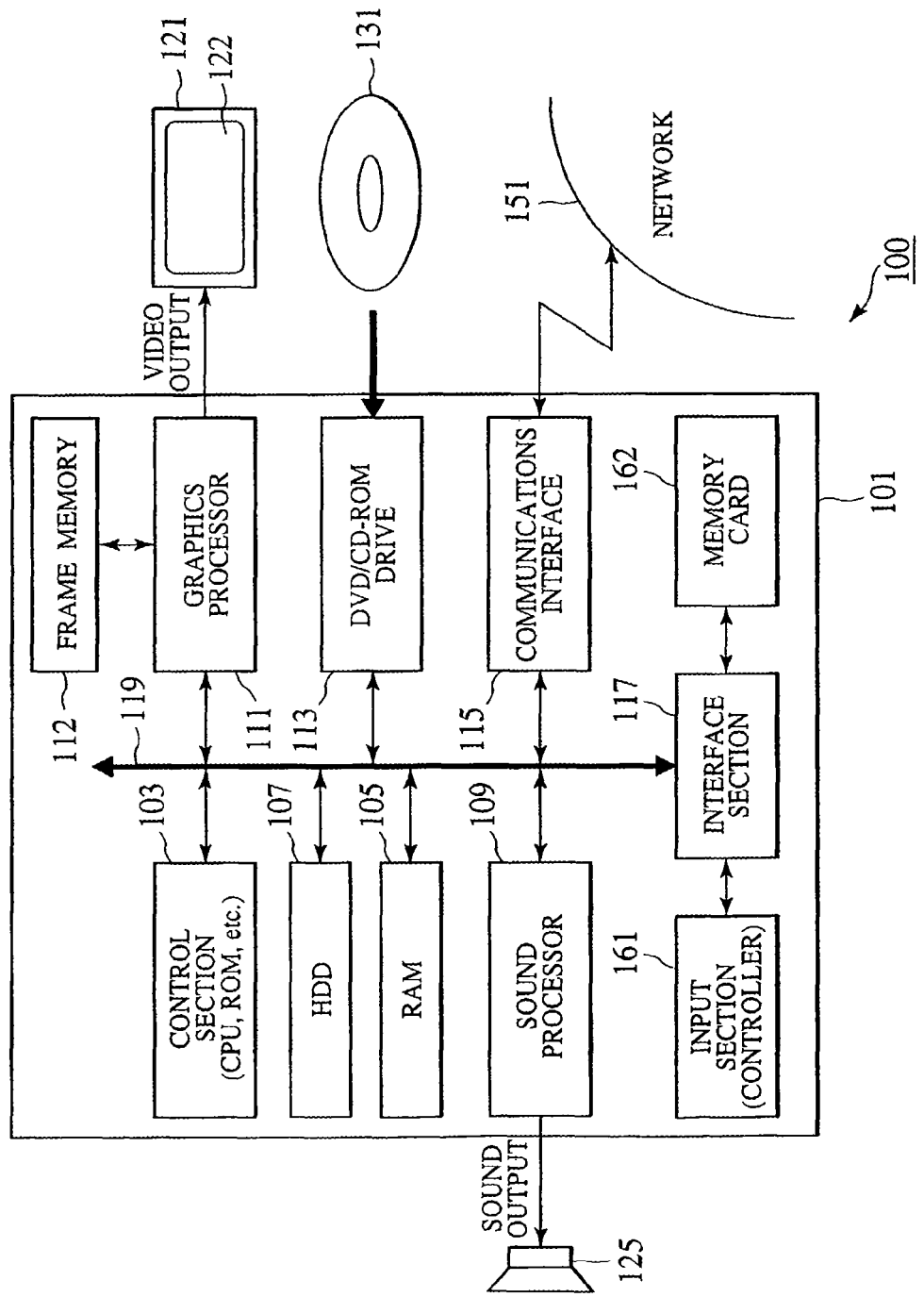
FIG. 2 is a block diagram illustrating a configuration of a video game apparatus of FIG. 1.

FIG. 2 is a block diagram showing a configuration of the video game apparatus 100 of FIG. 1. As illustrated in the figure, the video game apparatus 100 includes a video game main body 101. The video game main body 101 includes a control section 103 connected to its internal bus 119, a RAM (Random Access Memory) 105, a hard disk drive (HDD) 107, a sound processor 109, a graphics processor 111, a DVD/CD-ROM drive 113, a communications interface 115, and an interface section 117.

The sound processor 109 of the video game main body 101 is connected to a sound output device 125, which is a speaker, and the graphics processor 111 is connected to a display device 121 having a display screen 122. A storage medium (DVD-ROM or CD-ROM) 131 can be attached to the DVD/CD-ROM drive 113. The communications interface 115 is connected to a network 151. An input section (controller) 161 and a memory card 162 are connected to the interface section 117. A keyboard (not-shown) as the input section 161 may be connected to the interface section 117.

The control section 103 includes a CPU (Central Processing Unit), a ROM (Read Only Memory), etc., and executes a program stored on the HDD 107 or the storage medium 131, and controls the video game apparatus 100. The control section 103 has an internal timer. The RAM 105 is a work area for the control section 103. The HDD 107 is a storage area for storing a program and data. In the case where a program executed by the control section 103 instructs the sound processor 109 to output a sound, the sound processor 109 interprets the instruction and outputs a sound signal to the sound output device 125.

The graphics processor 111 develops an image onto the frame memory 112 and outputs a video signal, which displays the image on the display screen 122 of the display device 121 according to a drawing command output from the control section 103. It is assumed that one frame of the image included in the output video signal is displayed, for example, 1/30 sec. The DVD/CD-ROM drive 113 performs reading of the program and data to/from the storage medium 131. The communications interface 115 is connected to the network 151 to perform communications with other computers such as the server apparatus 200.

The interface section 117 outputs input data sent from the input section 161 to the RAM 105, and the control section 103 interprets it to carry out arithmetic processing. The input section 161 includes directional keys (four directions of upper, lower, right and left) and multiple operation buttons (four buttons of circle, cross, square, and triangle). The player character is moved by the operation of the directional keys, and a predetermined processing is performed by the operation of the operation buttons. The directional keys are also used to move a cursor and scroll the messages in the chat window. The operation buttons are also used to input a predetermined instruction. Moreover, the interface section 117 forwards data, indicative of the progress of the game stored in the RAM 105, to the memory card 162 based on the instruction from the control section 103. The interface section 117 reads data of the game stored in the memory card 162 at the time of stopping the game, and transfers read data to the RAM 105.

The program and data for performing the network game by the video game apparatus 100 are first stored on, for example, the storage medium 131. The program and data are read by the DVD/CD-ROM drive 113 and loaded onto the RAM 105 at the time of execution. The control section 103 processes the program and data loaded onto the RAM 105, outputs a drawing command to the graphics processor 111, and outputs an instruction of a sound output to the sound processor 109. Intermediate data is stored in the RAM 105 while the control section 103 performs processing.

In connection with the video game apparatuses 100, any general-purpose personal computer may be used as the video game main body 101 if similar structural components are provided. A cellular phone having the same function as that of the video game main body 101 may be used. A portable video game player, which contains the display device 121 and the sound output device 125 in the same cabinet as that of the video game main body 101, may also be used.

In the case where the video game main body 101 is a portable video game player, a semiconductor memory card may be used as the storage medium 131 in place of a DVD-ROM or CD-ROM. A card slot for inserting the memory card may be formed in place of the DVD/CD-ROM drive 113. In the case where the video game main body 101 is a general-purpose personal computer, the program and data relating to the present invention may be prestored to the HDD 107 instead of being stored in the storage medium 131. Regarding the storage medium for storing the program and data relating to the present invention, any kind of storage medium may be used according to the physical form of hardware and the distribution thereof.

Figure 3:
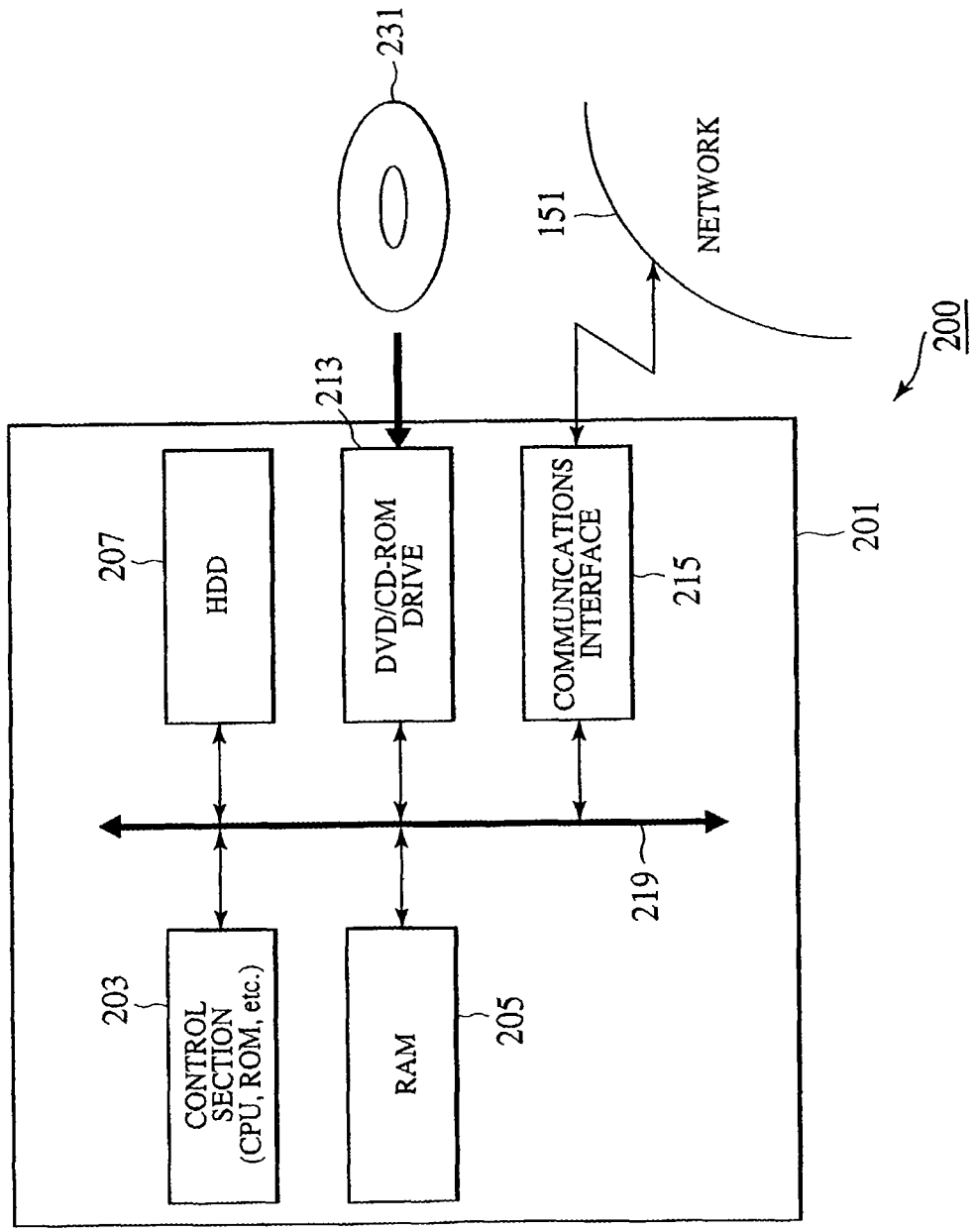
FIG. 3 is a block diagram illustrating a configuration of a game server apparatus of FIG. 1.

FIG. 3 is a block diagram showing a configuration of the game server apparatus 200 of FIG. 1. As illustrated in the figure, the game server apparatus 200 is constructed to have a game server main body 201. The game server main body 201 includes a control section 203 connected to its internal bus 219, a RAM 205, a hard disk drive (HDD) 207, a DVD/CD-ROM drive 213, and a communications interface 215. A storage medium (DVD-ROM or CD-ROM) 231 can be attached to the DVD/CD-ROM drive 213.

The control section 203 includes a CPU (Central Processing Unit), a ROM (Read Only Memory), etc., and executes a program stored on the HDD 207 or the storage medium 231, and controls the game server apparatus 200. The RAM 205 is a work area for the control section 203. The HDD 207 is a storage area for storing a program and data. The communications interface 215 is connected to the network 151 and performs communications with the respective video game apparatuses 100.

The program and data for performing the network game by the game server apparatus 200 are first stored on, for example, the storage medium 231. The program and data are read by the DVD/CD-ROM drive 213 and loaded onto the RAM 205 at the time of execution. The control section 203 processes the program and data loaded onto the RAM 205, and progresses the network game based on the messages sent from the respective video game apparatuses 100. Intermediate data is stored in the RAM 205 while the control section 203 performs processing.

An explanation will be next given of various kinds of data necessary to execute the network game according to this embodiment. Data processed by the video game apparatus 100 is displayed as an image on the display screen 122 and each player can recognize the progress of the network game from the image displayed on the display screen 122.

Figure 4:
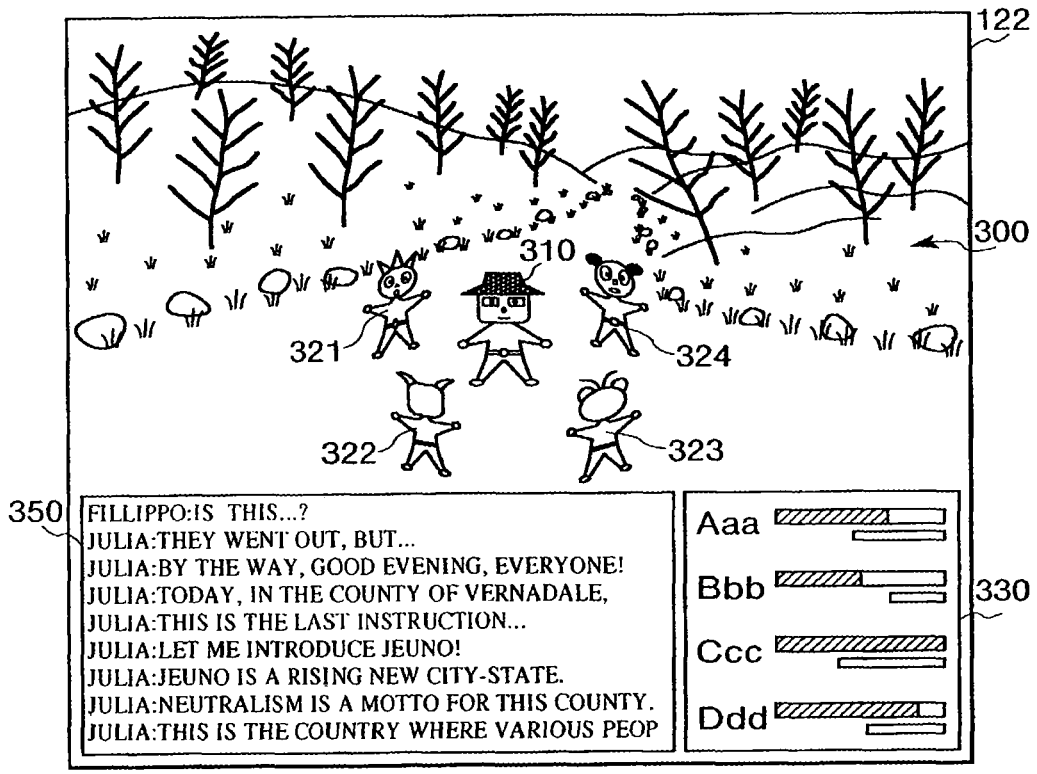
FIG. 4 is a view illustrating an example of a game screen displayed in the video game apparatus of FIG. 1.

FIG. 4 is a view showing an example of the display screen 122 displayed according to the progress of the game at the video game apparatus 100. As illustrated in the figure, a field 300, which serves as a space where characters (including player characters and non-player characters) can move, is displayed on the display screen 122. The field 300 is composed of geographic data complying with each scene of the game. On the field 300, there exist player characters 321 to 324, which move when the users of four video game apparatuses 100 operate the input section 161, and a non-player character 310 which appears by processing at the game server apparatus 200. In some cases, the non-player character 310 is a character that provides information to the player characters 321 to 324 or an enemy character, which wages a battle with the player characters. All of the player characters 321 to 324 are not always displayed on the display screen 122 depending on the current progress of the game.

At the lower right side of the display screen 122, a status window 330, which displays current statuses of the player characters 321 to 324, is provided. At the lower center to the left side of the display screen 122, a chat window 350 is provided. In the chat window 350, messages, which are sent to the video game apparatus 100 from the game server apparatus 200 according to the progress of the network game, are sequentially displayed and scrolled from bottom to top. One line at the lowest portion of the chat window 350 is used as a message input window when the player inputs a message from the input section 161.

The messages sent from the game server apparatus 200 are displayed in the chat window 350. The number of display lines in the chat window 350 can be changed as described later. The number of display lines in the chat window 350 gradually increases to the maximum number of lines (described later) every time a message is sent from the game server apparatus 200. The number of display lines in the chat window 350 gradually reduces to the minimum number of lines (described later) every time a timer counts a predetermined interval time set by the player (described later) or the player operates the cross button of the input section 161.

In the case where log messages (to be described later) are displayed, the chat window 350 enlarges up to the top portion of the display screen 122 according to the player's setting. In the case where the chat window 350 enlarges up to the top portion of the display screen 122, the player operates the directional keys for upper and lower directions (hereinafter referred to as upper and lower keys) of the input section 161 and thereby scrolls the log messages.

Figure 5:
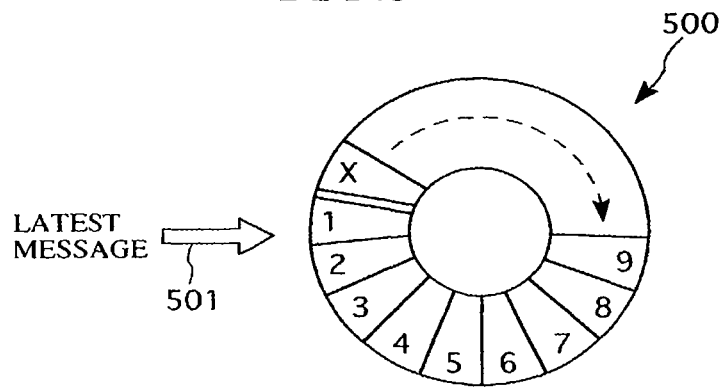
FIG. 5 is a view schematically showing a log message memory provided in the video game apparatus of FIG. 2.

FIG. 5 is a view schematically showing a log message memory provided in the RAM 105 of the video game apparatus 100. A log message memory 500 stores messages transmitted from the game server apparatus 200, and is formed of a ring buffer as illustrated in FIG. 5. A pointer 501, which points out the latest message of the stored messages, is also set. The log message memory 500 has a capacity that stores more messages than the maximum number of display lines can display in the chat window 350 at a normal time. In the log message of memory 500 of FIG. 5, "1" indicates the latest message, "2" indicates the second latest message, and "X" is the oldest message.

Figures 6A, 6B:
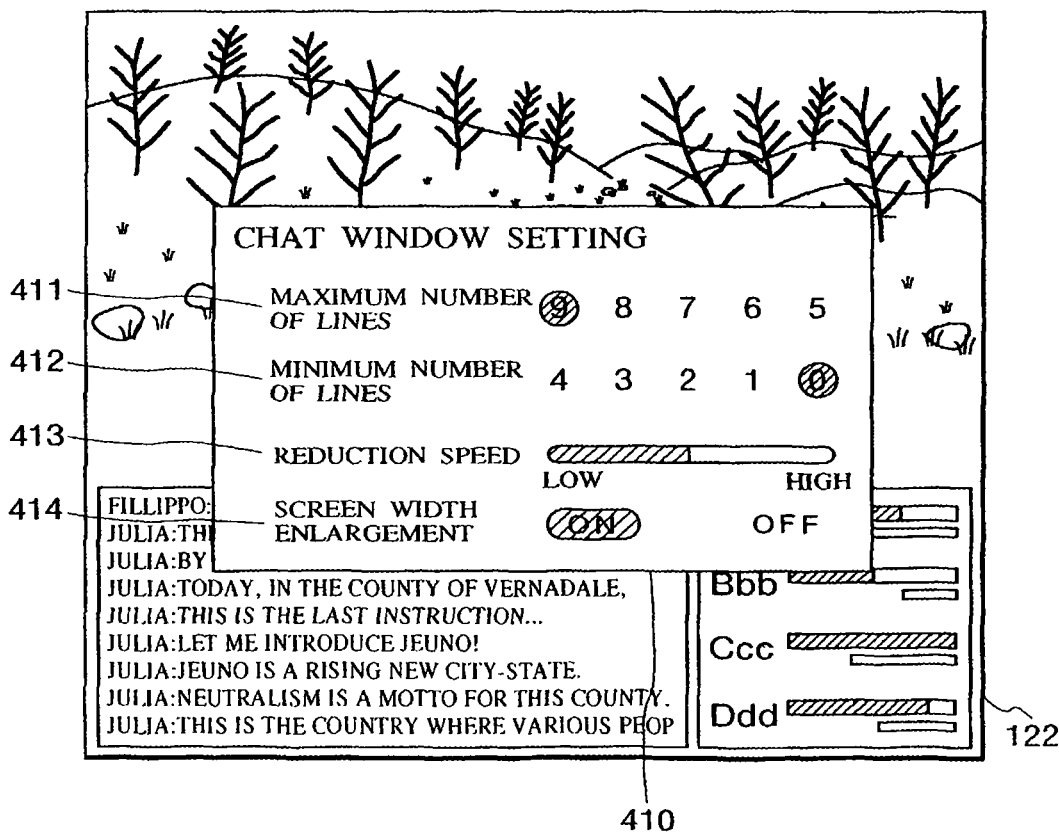
FIG. 6A is a view showing a chat window setting table provided in the video game apparatus of FIG. 2.
FIG. 6B is a view showing a chat window setting window.

FIG. 6A is a view showing a chat window setting table provided in the RAM 105 of the video game apparatus 100. FIG. 6B is a chat window setting window for setting data in a chat window setting table 400 of FIG. 6A. A chat window setting window 410 is displayed at the front side of a game screen of FIG. 4 in the display screen 122. The chat window setting window 410 can be opened by selecting an item of a menu (not shown) that is displayed by operating the square button of the input section 161. The chat window setting window 410 may be automatically opened on the screen at a log-in time.

Setting data such as the maximum number of lines 401, the minimum number of lines 402, a reduction speed 403 (one that is actually set is a time interval when the chat window 350 is reduced), and a screen width enlargement 404 are registered in the chat window setting window 400. The chat window 350 can temporarily stop variable control, of enlargement/reduction by an instruction from the player.

When the screen width enlargement 404 is set to OFF, the number of display lines of the chat window 350 is enlarged to only a setting value of the maximum number of lines 401 at a variable control stopping time. When the screen width enlargement 404 is set to ON, the number of display lines of the chat window 350 is enlarged up to the limit of the width in the longitudinal direction of the display screen 122 beyond the setting value of the maximum number of lines 401. When the screen width enlargement 404 is set to ON, log messages, which have been once erased, can be also displayed by scrolling. The setting value of the minimum number of lines 402 can be set to 0. When the setting value of the minimum number of lines 402 is set to 0, the chat window 350 is not displayed on the display screen 122 in some cases.

Setting data in the chat window setting table 400 can be changed on the chat window setting window 410 by the player. In a state that the chat window setting window 410 is opened, the player moves the cursor with the upper and lower keys of the input section 161 and selects any one of items 411 to 414. Then, the player moves the cursor with directional keys for right and left directions (hereinafter referred to as right and left keys) of the input section 161 and changes the setting of the selected item 411 to 414.

The following will explain processing in the network game system according to an embodiment. The network game progresses when the players exchange the messages. The messages input from the video game apparatuses 100 by the respective players are collected at the game server apparatus 200, and they are transmitted to all video game apparatuses 100 from the game server apparatus 200. In the progress of the game, the player characters 321 to 324 move on the field 300 according to the respective players' operations, and the non-player character 310 moves on the field by processing of the game server apparatus 200. The game server apparatus 200 generates a predetermined event (such as a battle against the enemy characters, which are the non-player characters, etc.) according to the current progress of the game. At the event generating time, a message is transmitted to each video game apparatus 100 from the game server apparatus 200 as necessary.

Regarding the contents of messages and the current progress of the game, they do not directly relate to the present invention and the explanation thereof is omitted. An explanation will be given of only processing for displaying the messages in the chat window 350. On the display screen 122, the field 300 of the game, the non-player character 310, the player characters 321 to 324, and the status window 330 are displayed. However, they do not directly relate to the present invention and the explanation thereof is omitted. The following will illustrate only the display state of the chat window 350.

Figure 7:
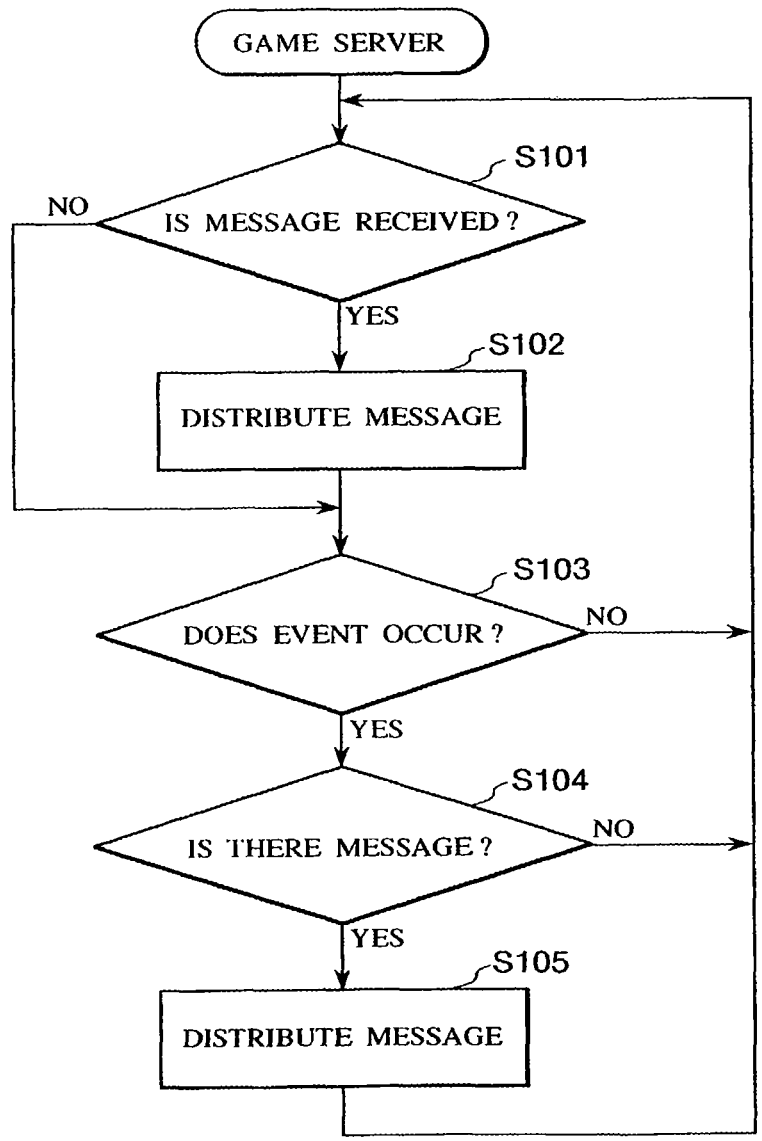
FIG. 7 is a flowchart showing processing to be executed by the game server apparatus in the network game system according to an embodiment of the present invention.

FIG. 7 is a flowchart showing exemplary processing that the control section 203 of the game server apparatus 200 executes. The control section 203 checks as to whether the communications interface 215 receives messages input from any one of the video game apparatuses 100 (step S101). When the communications interface 215 receives no messages from any video game apparatus 100, the processing flow proceeds to step S103.

When the communications interface 215 receives messages from any one or more of the video game apparatuses 100, the control section 203 causes the communications interface 215 to transmit all received messages to all video game apparatuses 100 in order of reception via the network 151 (step S102). After that, the processing flow proceeds to step S103.

In step S103, the control section 203 determines whether some event is generated by the operation of the player characters. If the event is generated, the control section 203 determines whether there is a message to be transmitted to the video game apparatus 100 in the event (step S104). If there is the message to be transmitted, the control section 203 causes the communications interface 215 to transmit the message to the video game apparatuses 100 of all players that perform message exchange via the network 151 (step S105). After that, the processing flow goes back to step S101. If no event is generated or an event is generated but there is no message to be transmitted therein, the processing flow goes back to step S101 directly.

An explanation will be next given of processing at each video game apparatus 100. In the each video game apparatus 100, processing for enlarging the chat window 350, processing for reducing (including erasing) the chat window 350, and processing for displaying log messages in the chat window 350 are carried out. The enlargement processing for the chat window 350, reduction processing for the chat window 350, and log message display processing are started with fixed timing and carried out in parallel, respectively. A display mode of the chat window 350 on the display screen 122 is required to be preset, and setting processing for the chat window 350 is also executed by the video game apparatus 100.

Figure 8:
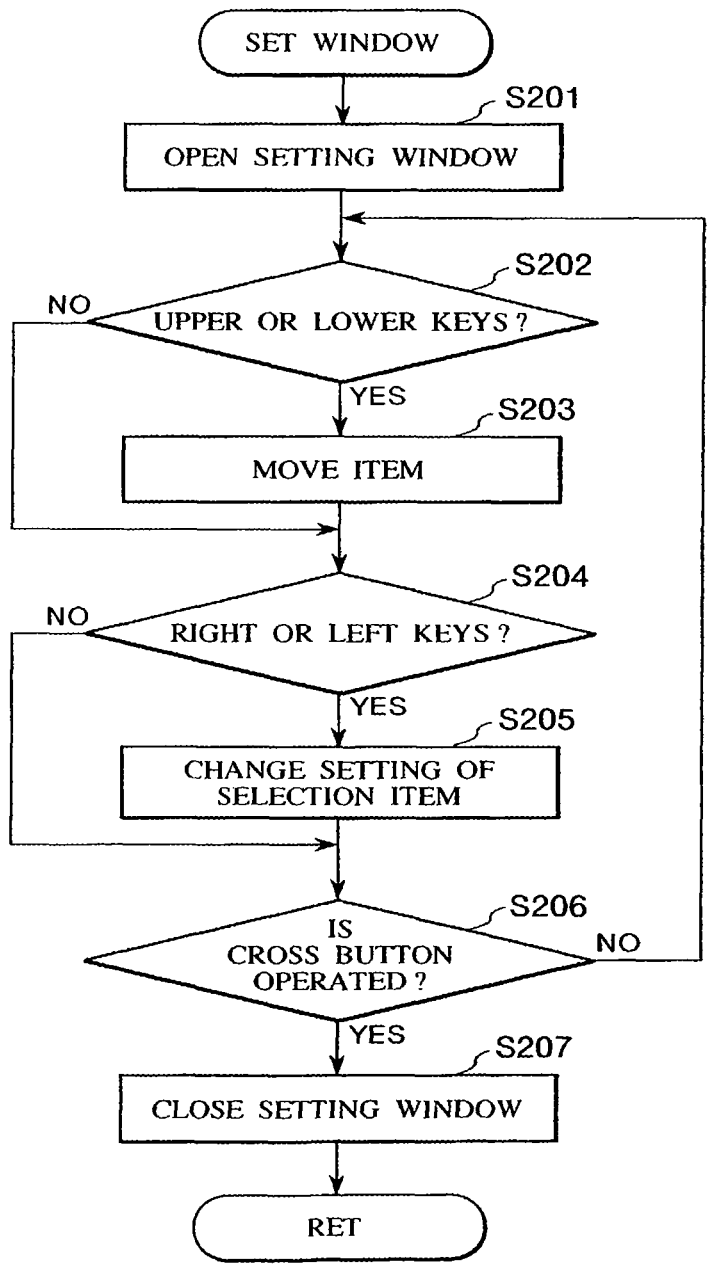
FIG. 8 is a flowchart showing chat window setting processing to be executed by each video game apparatus in the network game system according to an embodiment of the present invention.

FIG. 8 is a flowchart showing exemplary chat window setting processing that is executed by the control section 103 of the video game apparatus 100. Processing of this flowchart is carried out as one procedure in log-in processing when the video game apparatus 100 logs in to the game server apparatus 200. The player selects this processing according to the menu (not shown) by operating, for example, the square button of the input section 161 at arbitrary timing, so that the chat window setting processing can be started.

At the time of logging into the game server apparatus 200, the control section 103 of the video game apparatus 100 first opens the chat window setting window 410 to be displayed on the display screen (step S201). In a state that the chat window setting window 410 is opened, the control section 103 determines whether the upper or lower keys of the input section 161 are operated by the player (step S202). If the upper or lower keys are operated, the control section 103 moves the cursor, which is displayed in the chat window setting window 410, up or down in accordance with the operation of the upper or lower keys to select items 411 to 414 (step S203).

In the case where the upper or lower keys are not operated or after the selection of items 411 to 414 is moved, the control section 103 determines whether the right or left keys of the input section 161 are operated by the player (step S204). If the right or left keys are operated, the control section 103 moves the cursor right or left in the item 411 to 414 currently selected to change the setting of the corresponding item (step S205).

In the case where the right or left keys are not operated or after the setting of item 411 to 414 is changed, the control section 103 determines whether the cross button of the input section 161 is operated by the player (step S206). If the cross button is not operated, the processing flow goes back to step S202. If the cross button is operated, the control section 103 closes the chat window setting window 410 (step S207) and ends processing of this flowchart.

At the time of processing to this flowchart, the setting content may be transmitted to, for example, the game server apparatus 200 to store in a storage area of the game server apparatus 200. The control section 103 of the video game apparatus 100 reads the corresponding setting content from the game server apparatus 200 at a next logging-in time, thereby making it possible to omit processing of this flowchart at the next logging-in time.

Figure 9:
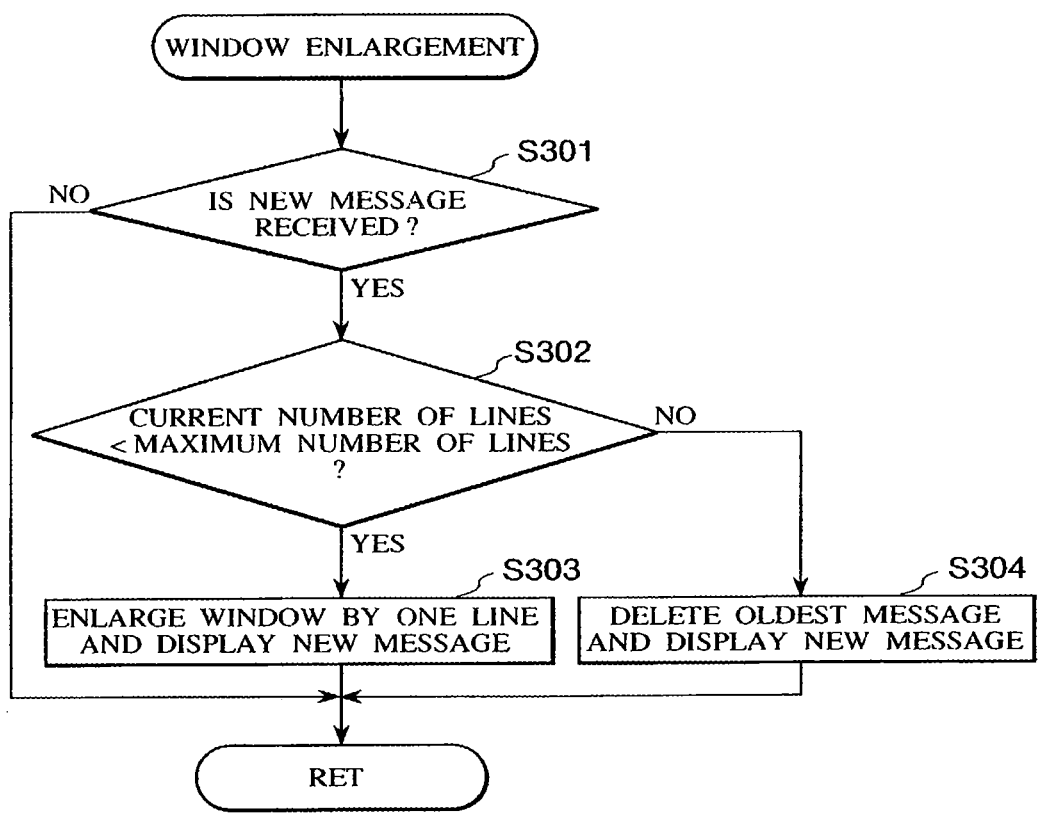
FIG. 9 is a flowchart showing chat window enlargement processing to be executed by each video game apparatus in the network game system according to an embodiment of the present invention.

FIG. 9 is a flowchart showing exemplary chat window enlargement processing that is executed by the control section 103 of the video game apparatus 100. In the chat window enlargement processing, the control section 103 first determines whether the communications interface 115 receives a message transmitted from the game server apparatus 200 (step S301). If the communications interface 115 does not receive a message transmitted from the game server apparatus 200, the chat window enlargement processing is ended.

If the communications interface 115 receives a message transmitted from the game server apparatus 200, the control section 103 determines whether the current number of display lines in the chat window 350 is smaller than the value of the maximum number of lines 401 set in the chat window setting table 400 (step S302).

If the current number of display lines is smaller than the value of the maximum number of lines 401, the control section 103 enlarges the chat window 350 by one line in an upper direction, scrolls the message already displayed in an upper direction, and displays the message newly received at the lowest line of the enlarged chat window 350 (step S303). After that, window enlargement processing is ended.

In the case where the current number of display lines has already been increased up to the setting value of the maximum number of lines 401, the control section 103 deletes the oldest message placed at the uppermost position of the chat window 350 as the size of the chat window 350 is maintained as it is. Also, the control section 103 scrolls the other messages in the upper direction and displays the newly received message at the lowest line of the chat window 350 (step S304). After that, window enlargement processing is ended.

Figure 10:
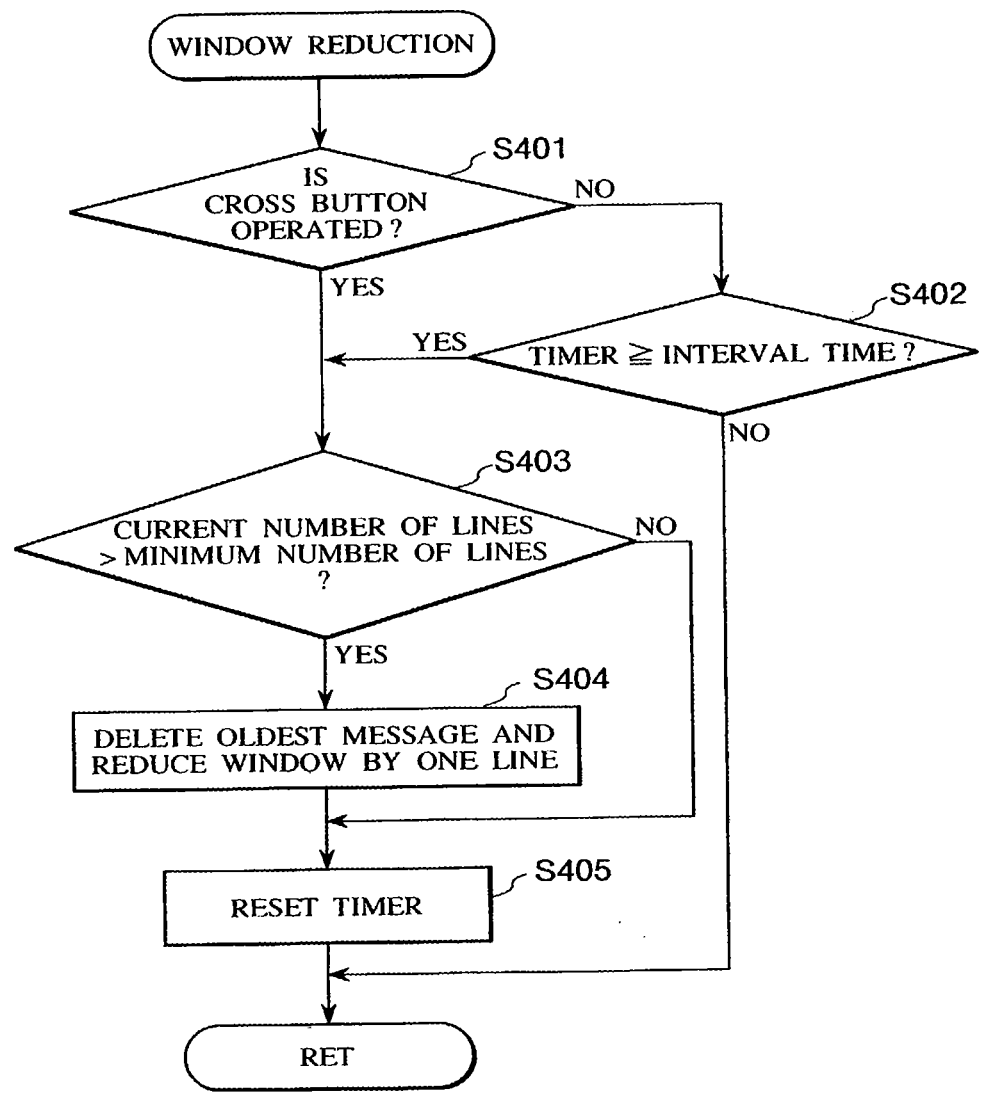
FIG. 10 is a flowchart showing chat window reduction processing to be executed by each video game apparatus in the network game system according to an embodiment of the present invention.

FIG. 10 is a flowchart showing exemplary chat window reduction processing that is executed by the control section 103 of the video game apparatus 100. In the chat window reduction processing, the control section 103 first determines whether the cross button of the input section 161 is operated by the player (step S401). If the cross button is not operated, the control section 103 determines whether a value counted by the timer reaches the interval time set as a reduction speed 403 in the chat window setting table 400 (step S402).

In the case where the cross button is operated in step S401 or the value counted by the timer reaches the interval time set in step S402, the control section 103 determines whether the current number of display lines in the chat window 350 is larger than the value of the minimum number of lines 402 set in the chat window setting table 400 (step S403). In the case where the current number of display lines has already been reduced to the value of the minimum number of lines 402, the processing flow directly proceeds to step S405.

In the case where the current number of display lines is larger than the value of the minimum number of lines 402, the control section 103 deletes the oldest message placed at the uppermost position of the chat window 350, and reduces the number of display lines in the chat window 350 by one line (step S404). After that, the processing flow directly proceeds to step S405.

In step S405, the control section 103 resets the value counted by the timer. The timer counts the value by a system clock or a timer interruption that is generated every predetermined time. When the value counted by the timer is reset, the window reduction processing is ended. In the case where the value counted by the timer does not reach the interval time set as the reduction speed 403 in step S402, the window reduction processing is directly ended.

FIG. 11 is a flowchart showing exemplary log message display processing that is executed by the control section 103 of the video game apparatus 100. In the log message display processing, the control section 103 first determines whether the triangle button of the input section 161 is operated by the player (step S501). If the triangle button is not operated, the log message display processing is directly ended.

In the case where the triangle button is operated, the control section 103 enlarges the chat window 350 up to the maximum, number of lines 401 set in the chat window setting table 400 (in the case where the number of display lines has already reached the maximum number of lines 401, the control section 103 does not enlarge the chat window 350 any more). Then, the control section 103 temporarily stops variable control of the chat window 350 (step S502). In the case where the number of display lines is increased, the control section 103 displays log messages above the messages currently displayed in the chat window 350 in chronological order of the log messages stored in the log message memory 500.

The control section 103 determines whether the circle button of the input section 161 is operated by the player (step S503). In the case where the circle button is operated, the control section 103 further determines whether the screen width enlargement 404 is set to ON (step S504). If the screen width enlargement 404 is set to ON, the control section 103 enlarges the chat window 350 up to the upper portion of the display screen 122 and displays the log messages, which are stored in the log message memory 500, above the message currently displayed in the chat window 350 in chronological order (step S505). After that, the processing flow directly proceeds to step S506.

In the case where the circle button is not operated or the screen width enlargement 404 is set to OFF though the circle button is operated, the control section 103 proceeds to processing in step S510, maintaining the number of display lines at the value of the maximum number of lines 401 in a state that variable control of the chat window 350 is continued to be temporarily stopped.

In step S506, the control section 103 determines whether the upper or lower keys of the input section 161 are operated by the player. If the upper or lower keys are operated, the control section 103 scrolls the log messages, which are stored in the log message memory 500, in the chat window 350 in accordance with the operations of the upper or lower keys (step S507), and the processing flow goes back to step S506. If the upper or lower keys are not operated, the control section 103 determines whether the cross button of the input section 161 is operated by the player (step S508). In the case where the cross button is operated, the control section 103 resets the number of display lines in the chat window 350 to the value of the maximum number of lines 401, maintaining the stop of variable control of the chat window 350 (step S509). After that, the processing flow proceeds to step S510.

In step S510, the control section 103 determines whether the cross button of the input section 161 is operated by the player. In the case where the cross button is not operated, the control section 103 goes back to processing in step S503, maintaining the number of display lines at the value of the maximum number of lines 401 in a state that variable control of the chat window 350 is continued to be temporarily stopped. In the case where the cross button is operated, the control section 103 restarts variable control of the chat window 350 that was temporarily stopped, and ends log message display processing.

The following specifically explains the chat window 350 and the display mode of the messages therein with reference to the drawings. FIGS. 12A to 12F are views each explaining the enlargement of the chat window 350 by chat window enlargement processing of FIG. 9. FIGS. 13A to 13E are views each explaining the reduction of the chat window 350 by chat window reduction processing of FIG. 10. FIG. 14A to FIG. 14C are views each explaining the log message display by log message display processing of FIG. 11.

It is assumed that the value of the maximum number of lines 401 is set to "9", and the value of the minimum number of lines 402 is set to "0" in the chat window setting table 400. It is also assumed that one message can be displayed with one line.

As shown in FIG. 12A, the chat window 350 is not provided on the display screen 122 until the video game apparatus 100 receives a message from the game server apparatus 200 (or when all messages are deleted by chat window reduction processing). If the video game apparatus 100 receives a message in this state, the chat window 350 with one display line is provided on the display screen 122 and the received message is displayed as shown in FIG. 12B.

When the video game apparatus 100 further receives a new message before the cross button of the input section 161 is operated or the timer counts the value of the interval time, the number of display lines in the chat window 350 is increased to two lines and two messages including the new message are displayed in the enlarged chat window 350 as shown in FIG. 12C. When the video game apparatus 100 receives another new message before the cross button of the input section 161 is operated or the timer counts the value of the interval time, the number of display lines in the chat window 350 is increased to three lines and three messages including the new message are displayed in the enlarged chat window 350 as shown in FIG. 12D.

When the video game apparatus 100 receives a new message in a similar manner, the number of display lines in the chat window 350 is increased up to nine lines, which are the same as the value of the maximum number of lines 401 set in the table 400, and nine messages including the new message are displayed in the enlarged chat window 350 as shown in FIG. 12E. Thereafter, when the video game apparatus 100 receives another new message before the cross button of the input section 161 is operated or the timer counts the value of the interval times, the oldest message displayed at the uppermost position of the chat window 350 is deleted as shown in FIG. 12F. In the chat window 350, the entirety of the remaining messages is scrolled in the upper direction and the newly received message is displayed at the lowermost position of the chat window 350.

It is assumed that the number of display lines in the chat window 350 has already been increased up to nine lines, which are the same as the value of the maximum number of lines 401 as shown in FIG. 13A. When the cross button of the input section 161 is operated or the timer counts the value of the interval time during a period when the video game apparatus 100 does not receive a new message, the oldest message displayed at the uppermost position of the chat window 350 is deleted and the number of display lines in the chat window 350 is reduced to eight lines as shown in FIG. 13B. When the cross button of the input section 161 is operated or the timer counts the value of the interval time during a period when the video game apparatus 100 does not receive a new message, the oldest message displayed at the uppermost position of the chat window 350 is deleted and the number of display lines in the chat window 350 is reduced to seven lines as shown in FIG. 13C.

When the cross button of the input section 161 is operated or the timer counts the value of the interval time during a period when the video game apparatus 100 does not receive a new message in a similar manner, the number of display lines in the chat window 350 is reduced to one line as shown in FIG. 13D. Under these circumstances, when the cross button of the input section 161 is operated or the timer counts the value of the interval time during a period when the video game apparatus 100 does not receive a new message, one line message displayed in the chat window 350 is also deleted and the chat window 350 is deleted as shown in FIG. 13E.

It is assumed that the messages are displayed in the chat window 350 while variable control of the chat window 350 is performed as shown in FIG. 14A. When the triangle button of the input section 161 is operated, the number of display lines in the chat window 350 is changed from six to nine lines, which is the value of the maximum number of lines 401, as shown in FIG. 14B. The log messages stored in the log message memory 500 are added to the increased three lines and displayed in chronological order. In this state, variable control of the chat window 350 is temporarily stopped. In other words, the number of display lines in the chat window 350 is fixed to nine lines. In the case where the video game apparatus 100 receives a new message, the new received message is displayed at the lowermost position of the chat window 350, and the oldest message is scrolled out upwardly and deleted from the display of the chat window 350.

When the circle button of the input section 161 is operated in the state of FIG. 14B, the chat window 350 is enlarged up to the upper portion of the display screen 122 as shown in FIG. 14C. In the enlarged portion, the log messages stored in the log message memory 500 are displayed in chronological order. The chat window 350 of FIG. 14C includes a scroll bar 351. The player operates the upper or lower keys of the input section 161, thereby making it possible to scroll all log messages, which are stored in the log message memory 500, in the chat window 350. The scroll bar 351 can also be provided in the chat window 350 that is in a state of FIG. 14B.

As explained above, in the network game system according to this embodiment, when the video game apparatus 100 receives a new message from the game server apparatus 200, the chat window 350 enlarges up to the value of the maximum number of lines 401 set in the table 400. An increase in the number of display lines in the chat window 350 makes it possible to ensure the time that passes from when the received message is displayed in the chat window 350 until the received message is scrolled out, so that the player can have enough time to see the messages. Since the number of display lines in the chat window 350 does not increase to more than the value of the maximum number of lines 401, visibility of the game screen is not significantly impaired by the chat window 350.

Upon each passage of the interval time set as the reduction time 403, the number of display lines in the chat window 350 reduces until the number of lines reaches the value of the minimum number of lines 402 set in the table 400. Also, when the player operates the cross button of the input section 161, the number of display lines in the chat window 350 reduces until the number of lines reaches the value of the minimum number of lines 402. If there is not a new message for the player to see, the chat window 350 can be sequentially reduced. For this reason, the player reduces the display lines of the chat window 350 to make it easy to visually identify the game screen including the field 300 of the game, the non-player character 310 and the player characters 321 to 324. The value of the minimum number of lines 402 can be set to 0. For this reason, when the display of the message is not completely needed, the player erases the display of the chat window 350 to make it much easier to see the game screen.

In the video game apparatus 100 that is applied to this network game, when the need for the player to see the messages is high, it is possible to make the messages easier to see, and when the need for the player to see the messages is low, it is possible to make the game screen easier to see. Accordingly, the relationship between the display of messages and the display of the game screen is kept in balance so that the player can easily advance the game.

The reduction in the chat window 350 is carried out at the time when the player himself/herself operates the cross button of the input section 161 and at the time when the timer counts the value of the interval time set as the reduction speed 403. The message, which the player himself/herself judges to be unnecessary, is low in the importance in the progress of the game. The message in which much time has been elapsed since the reception is low in the importance in the progress of the game, even if the player himself/herself does not judge the importance. In this network game, since the message with low importance in the progress of the game is erased to make it easy for the player to see the game screen, it is possible to advance the game smoothly.

The player can arbitrarily set the maximum number of lines 401 of the chat window 350, the minimum number of lines 402, and the reduction speed 403 in the chat window setting table 400. For this reason, the chat window 350 is enlarged/reduced in accordance with the player's selection, and the relationship between the display of messages and the display of the game screen can be kept in balance in accordance with the individual player preferences. The chat window setting window 410 that changes the data of the chat window setting table 400 can be opened not only at a log-in time but also with arbitrary timing during the game. The player can change the balance between the display of messages and the display of the game screen in accordance with a sense of the game obtained when the player actually played the game.

A fixed number of log messages erased from the chat window 350 is stored in the log message memory 500. The log messages can be scrolled and displayed in the chat window 350 any time when the player operates the triangle button and circle button of the input section 161 sequentially. Accordingly, the player can see the messages once erased whenever a need arises. This makes it possible to prevent occurrence of a case in which the player misses important messages thereby hindering progress of the game.

As to whether or not the size of the chat window 350 is enlarged to be more than the maximum number of lines 401 in the case of displaying the log messages stored in the log message memory 500 in the chat window, the player can decide the size of enlargement by setting the screen width enlargement 404. Accordingly, the player can select either the way of making the messages, which are stored as a log, easy to be seen or the way of making the game screen easy to be seen, and the display balance therebetween can be set in accordance with each player preference.

The present invention is not limited to the aforementioned embodiment, and various modifications may be possible. The following will explain modifications of the above embodiment applicable to the present invention.

In the aforementioned embodiment, the control section 103 resets the value of the timer when the cross button of the input section 161 was operated or the timer counted the interval time set as the reduction speed 403. In contrast to this, the control section 103 can reset the value of the timer even when a new message is received from the game server apparatus 200. This makes it possible to prevent the chat window 350 from being reduced by the time counted by the timer immediately after the chat window 350 is enlarged by the reception of the new message.

The enlargement processing and reduction processing for the chat window 350 may be executed with the same routine. In this case, the control section 103 can reset the value of the timer when the cross button of the input section 161 is operated, the timer counts the interval time set as the reduction speed 403, and a new message is received. In connection with the reduction processing for the chat window 350, processing in the case where the cross button of the input section 161 is operated and processing in the case where the timer counts the interval time may be executed with a different routine. In this case, the control section 103 can reset the value of the timer only when the timer counts the interval time.

The aforementioned embodiment gave the explanation on the assumption that each message transmitted to the video game apparatus 100 from the game server apparatus 200 was able to be displayed with one line in the chat window 350. However, a long message that cannot be displayed with one line may be transmitted in some cases. For example, in the case where the video game apparatus 100 receives a message that needs two lines to display, the number of display lines in the chat window 350 is increased by two lines (in this case, it is required to satisfy a condition that the value shall not exceed the maximum number of lines 401 set in the chat window setting table 400) and the newly received message can be displayed in the enlarged chat window 350 in the chat window enlargement processing of FIG. 9.

In the aforementioned embodiment, it was assumed that the reduction speed at which the chat window 350 was reduced was decided in accordance with the value set by the player in the chat window setting table 400. In contrast to this, the speed at which the chat window 350 is reduced may be changed in accordance with an interval for receiving a new message and a time interval for operating the cross button. The reduction speed at which the chat window 350 is reduced may be delayed while a specific message is displayed.

In the aforementioned embodiment, it was assumed that the oldest message placed at the uppermost position was first deleted in the case of reducing the chat window 350. In contrast to this, when the message placed at the uppermost position of the chat window 350 is a specific message, which has a high importance in the progress of the game, the second oldest message may be deleted to reduce the chat window 350.

In the aforementioned embodiment, in order to display the log messages stored in the log message memory 500, it was assumed that the number of display lines in the chat window 350 was increased up to the value of the maximum number of lines 401 by the operation of the triangle button thereafter being increased upwardly to the limit of the height of the display screen 122 by the operation of the circle button. However, the number of display lines in the chat window 350 may be increased up to the limit of the height of the display screen 122 directly by the operation of the circle button. When the player operates only the triangle button of the input section 161, the number of display lines in the chat window 350 may be increased up to the setting value of the maximum number of lines 401, and when the player operates the triangle button and circle button at the same time, the number of display lines in the chat window 350 may be increased up to the limit of the height direction of the display screen 122 beyond the maximum number of lines 401. In this case, it is possible to improve the balance between the display of messages and the display of the game screen in accordance with the current progress of the game.

The aforementioned embodiment explained the example of the case in which the present invention was applied to the network game in which the respective players of the multiple video game apparatuses 100 moved their player characters 321 to 324 to advance the game. However, the present invention can be applied to the general network games in which the players advance the game while chatting via the network regardless of whether the player characters appear or not. Regarding the client-side apparatuses that the respective players use, there can be used dedicated video game apparatus, general-purpose computers or cellular phones having a network connection function and an application executing function. The types of client apparatuses that the respective players use may be mixed.

In the aforementioned embodiment, it was assumed that the program and data of the video game apparatus 100 were stored in the storage medium 131 and distributed. It was also assumed that the program and data of the game server apparatus 200 were stored in the storage medium 231 and distributed. In contrast to these, these programs and data may be stored to a fixed disk device that a Web server apparatus existing on the network 151 has. In accordance with a request from each of the video game apparatuses 100 or the game server apparatus 200, the Web server apparatus may convert program data stored in the fixed disk device to a signal, and may superimpose the signal on a carrier wave to distribute to the video game apparatus 100 or the game server apparatus 200 via the network 151.

In the video game apparatus 100, the program and data, which the communications interface 115 has received from the Web server, can be stored in the HDD 107 and loaded on the RAM 105 at an executing time. In the game server apparatus 200, the program and data, which the communications interface 217 has received, can be stored in the HDD 207 and loaded on the RAM 205 at an executing time.

Although the invention has been described with reference to several exemplary embodiments, it is understood that the words that have been used are words of description and illustration, rather than words of limitation. Changes may be made within the purview of appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A video game apparatus connected, via a network, to a server apparatus, the server apparatus being connected to at least one other video game apparatus via the network, the video game apparatus comprising:
   a receiver that receives a message distributed from the server apparatus via the network;
   a provider that provides a chat window for displaying the message on a display screen in a case where the receiver receives the message; and
   a display device that displays a video game on the display screen and the message received by the receiver in the chat window,
   wherein when the video game apparatus receives a message from the at least one other video game apparatus via the server apparatus in a state that the chat window is not provided, the chat window is provided in an area of the display screen,
   wherein the chat window is deleted, and is not provided in the area of the display screen until the video game apparatus receives a message from the server apparatus, and
   wherein an oldest message may be selectively retained in the chat window instead of being deleted by chat window reduction processing, the chat window reduction processing sequentially deleting the oldest messages from the chat window when the oldest message is not a specific message identified with high importance, the chat window reduction processing deleting the second oldest message from the chat window when the oldest message is a specific message identified with high importance.

2. The video game apparatus according to claim 1, wherein the provider erases the chat window when a predetermined condition is satisfied after the receiver receives the message.

3. The video game apparatus according to claim 2, wherein the predetermined condition includes a condition that a predetermined time is elapsed since the receiver receives the message.

4. The video game apparatus according to claim 3, wherein the predetermined time can be set arbitrarily by a player's operation.

5. The video game apparatus according to claim 1, wherein the receiver receives the message distributed in accordance with progress of a video game.

6. The video game apparatus according to claim 1, wherein the provider provides the chat window having a size according to a player's operation on the display screen.

7. The video game apparatus according to claim 1, wherein the provider provides the chat window, in which message of the number of display lines according to a player's operation can be displayed, on the display screen.

8. The video game apparatus according to claim 7, wherein the provider erases the chat window in a case where the number of display lines is 0.

9. The video game apparatus according to claim 1, wherein the display device sequentially deletes the oldest message of all messages displayed in the chat window and displays a newly received message in the chat window when the number of display lines of the message in the chat window reaches the maximum value and the receiver receives the newly received message from the server apparatus.

10. The video game apparatus according to claim 1, further comprising:
    a holder that holds the messages received by the receiver, wherein the display device enlarges the chat window when the messages held by the holder are displayed.

11. The video game apparatus according to claim 10, wherein the display device scrolls and displays the held messages in the enlarged chat window.

12. The video game apparatus according to claim 10, wherein the display device displays the messages of the number of display lines more than the number of display lines before the enlargement in the enlarged chat window.

13. The video game apparatus according to claim 10, wherein the provider maximizes a size of the chat window in a case where a predetermined operation by a player is received, and
    wherein the display device adds and displays the held messages in a case where the chat window is enlarged.

14. The video game apparatus according to claim 10, wherein the display device scrolls and displays the held messages in response to a player's operation.

15. The video game apparatus according to claim 1, wherein the receiver receives a message corresponding to an event that occurs in a video game.

16. The video game apparatus according to claim 15, wherein the event is an event that is generated by an operation of a player character.

17. The video game apparatus according to claim 1, further comprising:
    a time counter that counts a time; and
    a window reducing device that reduces or erases the chat window in a case where the time counter counts a predetermined time.

18. The video game apparatus according to claim 17, wherein the time counter starts counting a new time when receiving a message by the receiver.

19. A non-transitory computer-readable storage medium on which a network game program for a video game apparatus is recorded, the video game apparatus being connected to a server apparatus via a network, the video game apparatus being also connected to at least one other video game apparatus via the network, the network game program causing the video game apparatus to execute:
  receiving a message distributed from the server apparatus via the network;
  providing a chat window for displaying the message on a display screen in a case where the message is received; and
  displaying a video game on the display screen and the received message in the chat window,
  wherein when the video game apparatus receives a message from the at least one other video game apparatus via the server apparatus in a state that the chat window is not provided, the chat window is provided in an area of the display screen,
  wherein the chat window is deleted, and is not provided in the area of the display screen until the video game apparatus receives a message from the server apparatus, and
  wherein an oldest message may be selectively retained in the chat window instead of being deleted by chat window reduction processing, the chat window reduction processing sequentially deleting the oldest messages from the chat window when the oldest message is not a specific message identified with high importance, the chat window reduction processing deleting the second oldest message from the chat window when the oldest message is a specific message identified with high importance.

20. A network game system comprising a server apparatus and a plurality of client apparatuses each connected to the server apparatus via a network, comprising:
  a distributor that distributes a message, transmitted from any one the plurality of client apparatuses, to at least one other of the plurality of client apparatuses;
  a receiver that receives the message distributed via the network by the distributor;
  a provider that provides a chat window for displaying the message on a display screen in a case where the receiver receives the distributed message; and
  a display device that displays a video game on the display screen and the message received by the receiver in the chat window,
  wherein when the video game apparatus receives a message from the at least one other video game apparatus via the server apparatus in a state that the chat window is not provided, the chat window is provided in an area of the display screen,
  wherein the chat window is deleted, and is not provided in the area of the display screen until the video game apparatus receives a message from the server apparatus, and
  wherein an oldest message may be selectively retained in the chat window instead of being deleted by chat window reduction processing, the chat window reduction processing sequentially deleting the oldest messages from the chat window when the oldest message is not a specific message identified with high importance, the chat window reduction processing deleting the second oldest message from the chat window when the oldest message is a specific message identified with high importance.

* * * * *

UNITED STATES PATENT AND TRADEMARK OFFICE
CERTIFICATE OF CORRECTION

PATENT NO. : 9,597,601 B2
APPLICATION NO. : 14/069861
DATED : March 21, 2017
INVENTOR(S) : Hiromichi Tanaka et al.

It is certified that error appears in the above-identified patent and that said Letters Patent is hereby corrected as shown below:

On the Title Page

Abstract, Line 2, "are once collected" should read -- are collected --.
Abstract, Line 12, "of new" should read -- of a new --.

In the Claims

In Column 18, Lines 20-21 (Claim 7, Lines 2-3), "in which message" should read -- in which a message --.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*